Nov. 27, 1962

H. F. CASTELIJNS

VACUUM BUFFER

Filed Dec. 9, 1960

3,065,892

Inventor
HENRI F. CASTELIJNS.

By Robert Harding Jr.
Attorney

United States Patent Office 3,065,892
Patented Nov. 27, 1962

3,065,892
VACUUM BUFFER

Henri F. Castelijns, Antwerp, Belgium, assignor to International Standard Electric Corporation, New York, N.Y., a corporation of Delaware Filed Dec. 9, 1960, Ser. No. 75,002
Claims priority, application Netherlands Dec. 12, 1959
4 Claims. (Cl. 226—97)

Figures 1, 2:
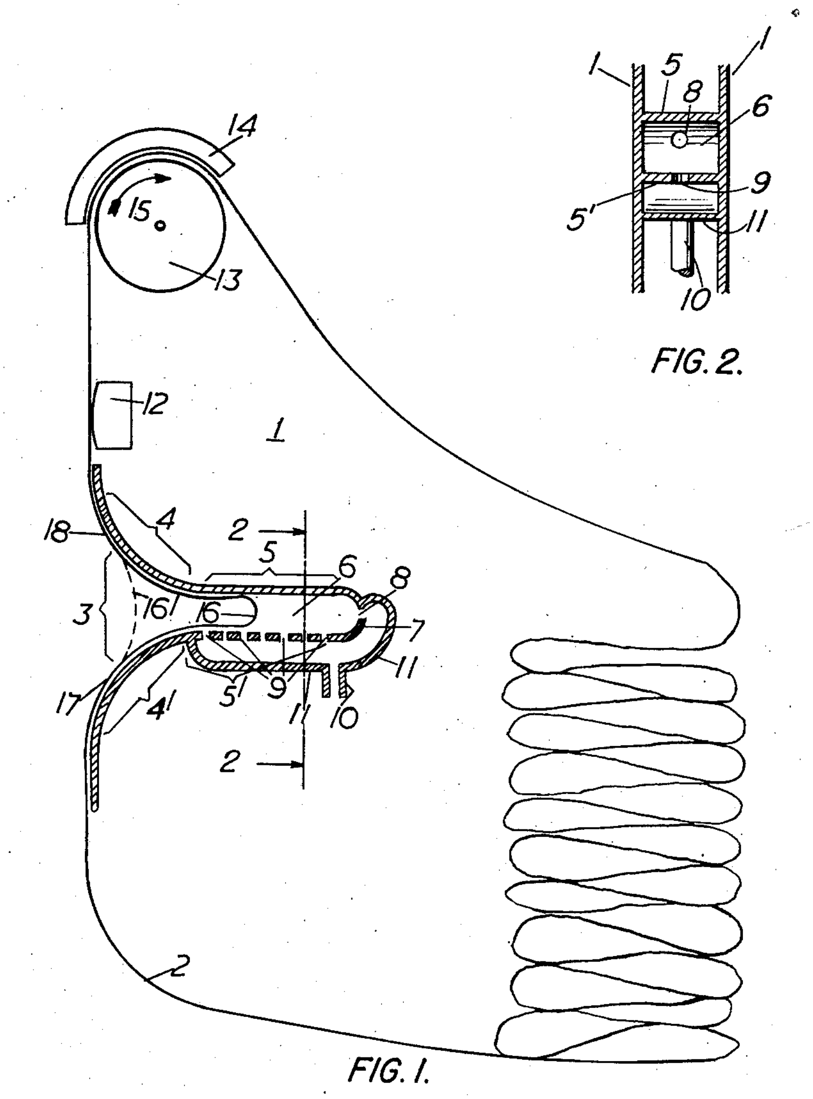

The present invention relates to tape supply systems and in particular those systems in which the tape is subjected to high accelerations and decelerations.

It has been suggested to utilize a vacuum type buffer to maintain tape equilibrium. This buffer includes a chamber with four walls, two of which are parallel to and separated from each other by the width of the tape while the other two walls are divergent on the side of the chamber closed by the tape. An evacuated conduit is connected to the chamber through an aperture on the side where the distance between the divergent walls is the smallest; thus creating a low pressure inside the chamber.

Such a system is known from French Patent No. 1,163,105 in which an apparatus is described for the high speed processing of a tape of flexible material (such as a magnetic tape) utilizing a vacuum type buffer. In this apparatus, the tape is wound on a reel and is delivered by means of a regulating device which permits the quantity of tape delivered to be equal to the extraction by the processing set (of the tape accumulated in the vacuum buffers) but retains the tape so as to maintain an equilibrium condition between the force exerted on the tape by the suction in the buffers and the retaining force of the regulating device. In this system, the only duty of the buffer is to exert a traction on the tape which gradually decreases as it enters the buffer.

However, this is no longer the case when the incoming end of the tape is free, as it is for instance in a mechanism for a magnetic memory with an endless tape where the tape is contained in a flat chamber in the form of a series of loops. Indeed, in this case, if the tape undergoes a quick deceleration in the processing set, it passes to the bottom of the buffer and, due to its inertia, forces back an excess amount of tape between the buffer and the driving device of the processing set. The excess tape thus takes an undetermined position, and the recording or the reading of information is greatly affected.

The use of mechanical regulating systems, on the other hand, offers the drawback that the mobile components of these regulators have a too large inertia.

An object of the present invention is to realize a vacuum buffer, which is able to exert its action on a free incoming tape without it being necessary to have this buffer preceded by a tape tensioning device, and which avoids the forcing back of the tape mentioned above.

According to one characteristic of the invention, the divergent wall, against which the part of the incoming tape glides, comprises a plurality of openings disposed over a certain length of said wall. Through these openings a suction is exerted on the incoming tape so as to cause a braking effect which gradually increases when the number of the openings which it closes increases.

According to another characteristic of the invention, the restrictive force (traction) exerted on the part of the tape leaving the buffer is equal to or higher than the inertia force exerted by this part of the tape (between the buffer and the brake) when it is decelerated by the braking means.

The above mentioned and other objects and features of the invention will become more apparent and the invention itself will be best understood by reference to the following description of an embodiment of the invention taken in conjunction with the accompanying drawings in which: FIG. 1 is a schematic side view of the vacuum buffer used in a magnetic memory with endless tape; and FIG. 2 is a sectional front view of the buffer chamber taken on the line 2—2 of FIG. 1.

In its preferred shape, the vacuum buffer is mounted between the two main parallel walls 1 of the magnetic tape magazine. These two walls are separated from each other by the width of magnetic tape 2 contained in the magazine and are common to the magazine and to the tape chambers. Between these parallel walls, a first chamber 3 is formed by the divergent walls 4 and 4'. A second chamber 6 is formed by the parallel walls 5 and 5' on the side where the walls 4 and 4' are at the shortest distance from each other. The walls 5 and 5' are joined by a half cylindrical shape constituting the bottom wall 7. This bottom wall is provided with a hole 8 which in common with the series of openings 9, disposed over the length of wall 5'; is connected to a low pressure source (not represented) via conduit 10. Naturally the vacuum supplied to the holes 9 may be effected from a low pressure source different from that supplying hole 8. For simplicity, however they are shown connected to a single conduit.

The processing set to which this buffer is associated is represented by the reading and writing device 12, the driving rotor 13 and the blocking stator 14. The application of the tape on the rotor is pneumatically controlled and is described in detail in Belgian Patent Nos. 517,967 to W. Pouliart et al. and 553,765 to W. Pouliart et al.

The operation of the buffer is as follows:

As the tape 2 is drawn by the rotor 13 turning in the direction of the arrow 15, it passes through the chambers 3 and 6, forming a loop 16, before passing in front of the device 12. This loop is produced by the force of atmospheric pressure exerted on the outside face of the tape (due to the vacuum or low pressure in the chamber 6). Due to this force a friction is exerted on the incoming and outgoing tape, parts 17 and 18 respectively.

As part 17 is free, loop 16 has a tendency to enter the chamber 6 until it reaches the bottom wall 7. But as the loop 16 enters the chamber 6, the incoming tape 17 closes an increasing number of openings 9, and undergoes a suction exerted through these openings. The tape is thus braked due to the friction on the wall 5'. This braking effect is greater as the number of closed openings 9 increases. During the time the tape is moving an equilibrium condition is established between this braking effect and the force exerted on the tape by the rotor 13 via the loop 16.

Let us now consider what happens when the tape stops. When the rotor 13 is decelerated suddenly and rapidly by its associated blocking stator 14 the tape, due to its inertia, attempts to pile up in excess between the device 12 and the rotor 13. This excess has a double drawback:

(1) The quantity of tape which passes in front of the device 12 after the stop order has been given is undetermined.

(2) The starting of the tape which is located in front of the device 12 is delayed with respect to the go order and this delay is also indeterminable.

To avoid these drawbacks, care must be taken that the force exerted, on the part 18 of the tape, due to the suction of the loop 16 in the chamber 6, is equal to or higher than the kinetic energy developed by the part of the tape located between the chamber 6 and the stator 14 when the rotor 13 is decelerated.

To realize this force, it is first of all necessary to give the chamber 6 a sufficient length in relation to the vacuum which is realized therein; care must then be taken to insure the vacuum is not altered during the operation. The part 17 of the tape is free, and ordinarily in the absence of holes 9 during braking, it will enter the chamber 6 by inertia until the loop 16 makes contact with the bottom 7. At this moment, the force exerted on the loop due to the suction will be reduced, and the kinetic energy of the part 18 up to the stator 14 may overcome it. The braking action produced by the suction exerted on the tape through the openings 9 and which increases when the number of these closed openings increases due to the loop 16 entering the chamber 6 in the direction of its bottom, avoids the above disadvantage i.e. the loop does not come into contact with this bottom.

When the tape is again driven by the rotor 13, the part of tape 18, leaving the chambers 3 and 6, moves the loop towards the outside until a sufficient number of the openings 9 are made free so as to establish an equilibrium condition. From this moment on, the part 17 starts moving.

Let us now consider the case wherein the tape 2 undergoes a chance braking when it is disengaged from the mass of tape accumulated in the magazine. In these conditions, the surplus of resistance on the incoming part 17 breaks the equilibrium condition existing between the braking action produced due to the openings 9 and the traction exerted by the loop 16; the tape is displaced towards the outside, and due to this, a smaller number of openings 9 is closed by the incoming part of the tape, so that the braking action diminishes at this place and the equilibrium condition is restored.

The regulating effect explained above will be produced as long as the chance braking of the tape from the magazine remains smaller than the traction exerted on the loop 16 in the chamber 6. If this braking would become higher than this traction, the operation would become automatically that of the buffers represented in the French Patent No. 1,163,105, i.e. the loop would be displaced until it reaches the chamber 3. An example of the result of such a displacement is represented at 16'. The force exerted by the suction on this loop 16' would thus increase as the latter is displaced towards the outside, and this increase of force would permit the overcoming of this fortuitous braking.

While the principles of the invention have been described above in connection with specific apparatus, it is to be clearly understood that this description is made only by way of example and not as a limitation on the scope of the invention.

What is claimed is:

1. A buffer for counteracting tape inertia in a high speed tape system comprising a four walled chamber, two of said walls being parallel and separated by the width of the tape and the other two walls together forming a flared U-shaped cavity within the two parallel walls, there being at least one aperture at the closed end of said U-shaped cavity and a plurality of successively arranged apertures along that wall of said last mentioned walls first to be encountered by the the tape passing through said buffer, said apertures being between the flared end of said cavity and the closed end, and means for connecting said aperture and said plurality of apertures to a low pressure source.

2. A buffer as claimed in claim 1 in which the means for connecting the apertures and the plurality of apertures to a low pressure source comprises a cavity having a single input conduit and encompassing all the apertures, whereby all said apertures are connected to the same low pressure source.

3. A buffer as claimed in claim 1 in which the two walls forming the U-shaped cavity are parallel for a predetermined length closing in an arc on one end and diverging on the other, and in which the plurality of apertures are arranged successively only along the parallel length.

4. A buffer as claimed in claim 3 in which the two walls forming the U-shaped cavity diverge to the point where they are perpendicular to the parallel portions thereof.

References Cited in the file of this patent

UNITED STATES PATENTS

| | | |
|---|---|---|
| 1,610,818 | Spadone et al. | Dec. 14, 1926 |
| 2,816,757 | Burkhart | Dec. 17, 1957 |
| 2,968,982 | Cousino | Jan. 24, 1961 |
| 2,994,489 | Hare | Aug. 1, 1961 |

FOREIGN PATENTS

| | | |
|---|---|---|
| 545,507 | Canada | Aug. 27, 1957 |